United States Patent [19]

Ashizawa

[11] 3,905,158

[45] Sept. 16, 1975

[54] MACHINE TOOLS

[75] Inventor: Yoshimi Ashizawa, Zama, Japan

[73] Assignee: Toshiba Kikai Kabushiki Kaisha, Tokyo, Japan

[22] Filed: Mar. 5, 1974

[21] Appl. No.: 448,386

[52] U.S. Cl. .................................. 51/89; 82/14 B
[51] Int. Cl.² .......................... B24B 5/00; B24B 7/00
[58] Field of Search ....... 51/88, 89, 117, 118, 80 R, 51/90, 332; 82/14 B, 9

[56] References Cited
UNITED STATES PATENTS

| 2,388,545 | 11/1945 | Horak | 82/14 B |
|---|---|---|---|
| 2,546,490 | 3/1951 | Baldwin et al. | 51/90 |
| 3,110,987 | 11/1963 | Arneson | 51/117 |
| 3,133,383 | 5/1964 | Chapman | 51/117 |
| 3,167,884 | 2/1965 | Thompson | 51/117 |

Primary Examiner—Othell M. Simpson
Attorney, Agent, or Firm—Wenderoth, Lind & Ponack

[57] ABSTRACT

In a machine tool wherein a plurality of tools which are arranged about a rotary workpiece at an equal angular spacing are advanced or retracted by the same distance, there are provided a snychronizing templet connected to a main tool and having reference surfaces which intersect at the same angle with a line of movement of the main tool and styluses mounted on follow up tools. By the cooperation of the styluses and the reference surfaces the follow up tools are advanced or retracted by the same distance as the main tool.

4 Claims, 3 Drawing Figures

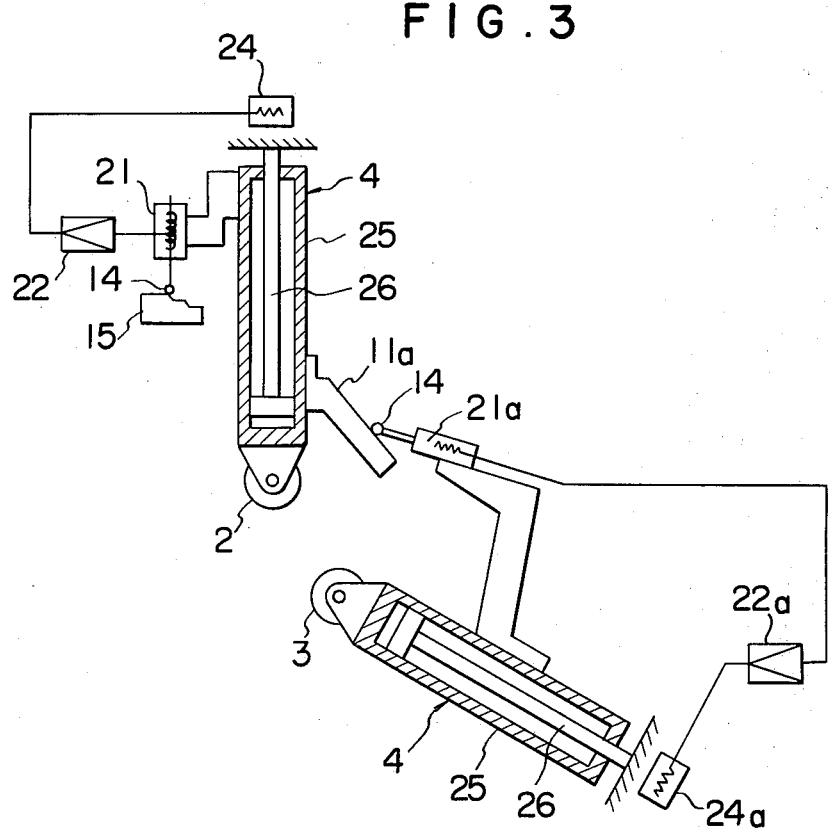

MACHINE TOOLS

BACKGROUND OF THE INVENTION

This invention relates to a machine tool having a plurality of working tools simultaneously operating on a common workpiece, and more particularly to a synchronous control device of such tools.

In a method of working a rotary workpiece, wherein a tool, a grinding wheel for example, is urged against the periphery of the workpiece and moved in the axial direction thereof, it is usual to first roughly work and then the tool is advanced a little for finishing. According to the quantity of working and fineness of the finished product it is necessary to repeat such operations several times.

In a spinning machine operating under the principle just described, it is common to use a plurality of tools spaced from each other by the same angle on a circle about the axis of the rotary workpiece in order to prevent flexure thereof caused by a strong pressure applied by the tools. In such a spinning machine, it is necessary to advance respective tools by the same distance. In a prior art machine, since advance of respective tools were made independently not only did the extent of advance of respective tools differ, but also required a large time.

SUMMARY OF THE INVENTION

It is an object of this invention to provide an improved machine tool capable of advancing synchronously, or by the same distance, a plurality of tools simultaneously operating on the same workpiece.

Another object of this invention is to provide an improved control device for a plurality of tools capable of synchronously advancing or retracting them by the same distance by merely controlling one of the tools.

According to this invention, there is provided a machine tool of the type wherein a plurality of tools which are arranged about the axis of a rotary workpiece at an equal angular spacing are advanced or retracted by the same distance toward and away from said axis, characterized in that there are provided a synchronizing templet connected to one of the tools, or a main tool, said templet having reference surfaces which intersect at the same angle with a line along which the main tool is moved, styluses mounted on another or follow up tools for cooperating with the reference surfaces respectively, and means controlled by the cooperation of the styluses and the reference surfaces for advancing or retracting the follow up tools by the same distance as the main tool.

BRIEF DESCRIPTION OF THE DRAWING

In the accompanying drawing:

FIG. 3 is a connection diagram of a portion of the control system utilized in this invention.

DESCRIPTION OF THE PREFERRED EMBODIMENT

Figure 1:
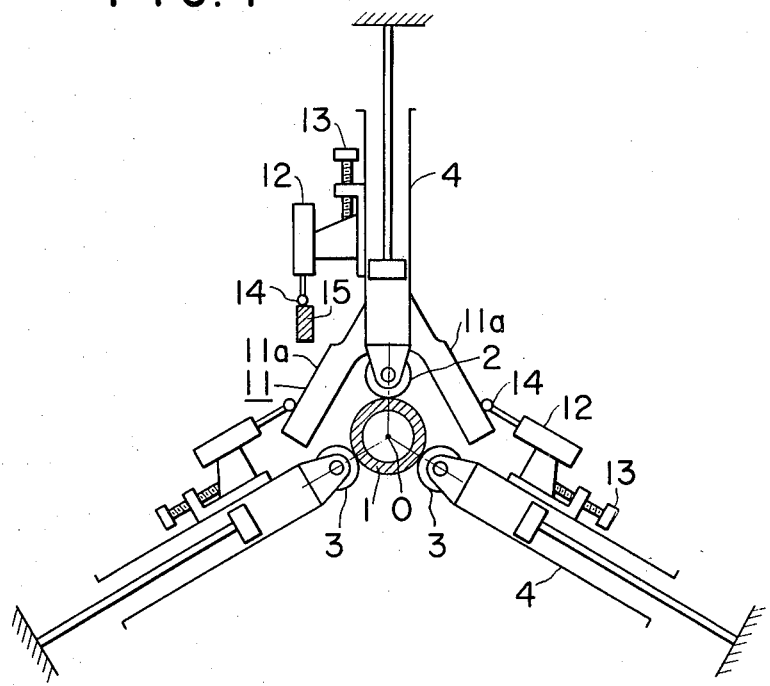
FIG. 1 is a front view of certain essential parts of a spinning machine embodying the invention.

With reference now to FIG. 1 of the accompanying drawing, a workpiece, illustrated as a thick walled tube 1 is supported between a headstock and a tailstock (not shown) of a lathe to be rotated about its axis O. About the axis O are provided a main tool 2 and two follow up tools 3 which are disposed at the same angular spacing, that is 120° in this case, about axis O. Each tool takes the form of a roller which is urged against the periphery of the workpiece 1 in the radial direction by means of a hydraulic ram 4. The rollers 2 and 3 are moved in the axial direction of the workpiece 1 by a driving device, not shown, together with a templet 11 and tracers 12 to be described later.

Templet 11 takes the form of a saddle and has two reference surfaces 11a each intersecting at an angle of 30° with a line (vertical line in the illustrated example) along which the main tool or roller 2 is reciprocated by ram 4. The upper end of the templet is secured to the cylinder of ram 4 to move therewith in the vertical direction. Each tracer 12 is slidably mounted on the ram 4 of the follow up tool 3 and carries at its outer end a stylus 14 which engages the reference surface 11a. The relative position of the stylus 14 and the reference 11a can be adjusted by means of a screw 13. The stylus 14 of the main tool 2 cooperates with a main templet 15 extending in the axial direction of the workpiece 1 and having a reference surface conforming to the axial contour of the product.

As diagrammatically shown in FIG. 3 the electric control system utilized in this invention comprises means for detecting the displacement of the main stylus 14, such as a differential transformer 21, and a servovalve 24 energized by the output of the differential transformer 21 through an amplifier 22 for admitting pressurized liquid into the cylinder 25 of ram 4. In this case, piston 26 in cylinder 25 is stationary and the cylinder 25 carrying the main roll 2 and templet 11 is moved toward and away from the workpiece 1.

The ram 4 of each follow up tool 3 (only one is shown in FIG. 3) includes a differential transformer 21a for detecting the displacement of the stylus 14 cooperating with the reference surface 11a, and a servovalve 24a connected to the differential transformer 21a via an amplifier 22a for admitting pressurized liquid into the cylinder of ram 4. With this arrangement, follow up tools are cuased to move toward and away from the workpiece by the same distance as the main tool.

The control device described above operates as follows.

At first, the main tool 2 and the follow up tools 3 are positioned a short distance apart from one end of the workpiece 1. Under these conditions, rams 4 are operated to position the working surfaces of respective tools on a circle having a diameter a little smaller than the outer diameter of the workpiece 1. At this time, the stylus 14 of the main tool 2 engages the reference surface of the main templet 15 whereas the stylus 14 of the follow up tools 3 are caused to engage the reference surfaces 11a of the templet 11 by the operation of their rams 4. When the engagement of respective styluses is not uniform, adjusting screws 13 are operated such that all styluses engage corresponding points on respective reference surfaces.

Then the workpiece 1 is rotated and the main and follow up tools are moved in the axial direction of the workpiece together with synchronizing templet 11, tracers 12 and rams 4. Under these conditions, as the stylus 14 of the main tool 2 scans the reference surface of the main templet 15, a first coarse working (in this case the spinning operation) is performed.

After finishing of the coarse working, the stylus 14 of the main tool 2 is retracted from the reference surface of the main templet a short distance corresponding to a required working depth by operating the screw 13. Then the ram 4 of the main tool 2 is operated to advance the main tool until the stylus 14 again engages the main templet 15. As the main tool 2 and the templet 11 are advanced in this manner, follow up tools 3 are also advanced the same distance in a manner to be described latter. Thereafter the main and follow up tools are moved in the axial direction of the workpiece 1, thus performing a second or finishing spinning operation. By repeating the cycle described above a finished product having a desired contour can be obtained.

The follow up tools 3 are advanced in the following manner. More particularly, as the synchronizing templet 11 is advanced together with the main tool, the styluses 14 are displaced upwardly for advancing the follow up tools 3 by a corresponding distance.

Figure 2:
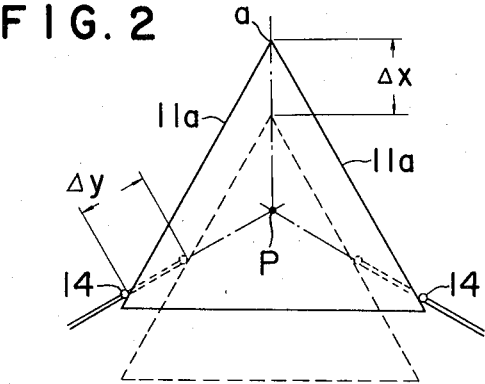
FIG. 2 is a diagram useful to explain the operation of the spinning machine shown in FIG. 1

FIG. 2 is a diagram showing the relationship between the advances of the main and follow up tools. As has been pointed out, each reference surface 11a of the synchronizing templet 11 makes an angle of 30° with respect to the vertical or the direction of movement of the main tool. In other words, an apex $a$ of a regular triangle at which the synchronizing templet 11 is connected to the ram 4 is moved in the vertical direction as the main tool is advanced. Consequently, the styluses of the follow up tools 3 disengage the reference surfaces 11a with the result that electrical signals are produced to operate the servovalves 24a associated with the rams 4 of the follow up tools, thus advancing styluses 14 thereof toward the center P of the triangle. A dotted line triangle shows the condition wherein the apex $a$ or the synchronizing templet 11 has been moved downwardly by a distance $x$ by the operation of ram 4. As a result, the styluses 14 of the follow up tools 3 are advanced $\Delta y$ toward the center P of the triangle in a manner just described. Since the triangle is a regular triangle, $\Delta x = \Delta y$. In this manner, the follow up tools are advanced by the same distance as the main tool, so that whenever the main tool is advanced or retracted the follow up tools are also advanced or retracted by the same distance, thus enabling ready settings of a plurality of working tools.

From the foregoing description, it will be clear that the invention can equally be applied to other types of machine tools such as a lathe or grinding machine.

What is claimed is:

1. In a machine tool of the type wherein a plurality of tools which are arranged about the axis of a rotary workpiece at an equal angular spacing are advanced or retracted by the same distance toward and away from said axis, the improvement which comprises a synchronizing templet connected to one of the tools, said templet having reference surfaces which intersect at the same angle with a line along which said one tool is moved, styluses mounted on the other tools for engaging said reference surfaces, respectively, and hydraulic rams operatively coupled to said other tools and said styluses and controlled by the engagement of said styluses on said other tools with said reference surfaces for advancing or retracting said other tools by the same distance as said one tool.

2. The machine tool according to claim 1 wherein said styluses are adjustably mounted on said rams.

3. The machine tool according to claim 1 wherein said one tool is also provided with a stylus which is advanced to engage a main templet extending in the axial direction of said workpiece.

4. The machine tool according to claim 1 wherein the stylus of each of said other tools is provided with electric means for generating a signal proportional to the displacement thereof and a servovalve responsive to the signal for admitting or discharging pressurized fluid into and out of said hydraulic ram.

* * * * *